(12) United States Patent
Chen

(10) Patent No.: US 9,741,325 B2
(45) Date of Patent: Aug. 22, 2017

(54) FOLDABLE FLOOR STAND FOR GUITAR

(71) Applicant: Aroma Music Co., Ltd., Shenzhen (CN)

(72) Inventor: Haihua Chen, Shenzhen (CN)

(73) Assignee: AROMA MUSIC CO., LTD., Shenzhen (CN)

( * ) Notice: Subject to any disclaimer, the term of this patent is extended or adjusted under 35 U.S.C. 154(b) by 0 days.

(21) Appl. No.: 15/185,696

(22) Filed: Jun. 17, 2016

(65) Prior Publication Data

US 2017/0124995 A1 May 4, 2017

(30) Foreign Application Priority Data

Nov. 2, 2015 (CN) .................... 2015 2 0861154 U

(51) Int. Cl.
*F16M 11/38* (2006.01)
*G10G 5/00* (2006.01)

(52) U.S. Cl.
CPC .............. *G10G 5/00* (2013.01); *F16M 11/38* (2013.01); *F16M 2200/025* (2013.01)

(58) Field of Classification Search
CPC ..... G10G 5/00; F16M 11/38; F16M 2200/025
USPC .................... 248/121, 126, 166; 84/327, 453
See application file for complete search history.

(56) References Cited

U.S. PATENT DOCUMENTS

| | | | | |
|---|---|---|---|---|
| 5,149,901 A * | 9/1992 | Boor | ........................ | G10G 5/00 248/167 |
| 5,505,413 A * | 4/1996 | Hennessey | ............... | G10G 5/00 248/166 |
| 5,744,735 A * | 4/1998 | Liao | ........................ | G10G 5/00 224/910 |
| 5,836,552 A * | 11/1998 | Yu | ............................ | G10G 5/00 248/166 |
| 6,113,040 A * | 9/2000 | Yu | .......................... | F16M 11/16 248/166 |
| 6,722,617 B2 * | 4/2004 | Wilfer | .................... | F16M 11/16 248/163.1 |
| 2007/0068362 A1 * | 3/2007 | Bordignon | ............... | G10G 5/00 84/327 |
| 2013/0048804 A1 * | 2/2013 | Furuta | ..................... | G10G 5/00 248/168 |

* cited by examiner

*Primary Examiner* — Gwendolyn Baxter
(74) *Attorney, Agent, or Firm* — Anova Law Group, PLLC

(57) ABSTRACT

A foldable floor stand for guitar, comprises supporting rods, whose top ends are intermeshed, and aluminum tubes connecting with bottom ends of the supporting rods to support a guitar; two plastic engagers are set on top of the supporting rods, a rotatable pad apparatus contacting with guitar surface is arranged on side of the plastic engager supporting the guitar. Due to adopting a pad apparatus to make the plastic supporting panel and back face of the guitar contact in surface, frictions are increased and placements of a guitar or other music instruments onto the stand are more stable, more secure, harder to slide and fall. Connecting supporting rods and aluminum tubes moveably, makes it convenient to adjust positions of supporting rods, to adopt different styles of guitars; it is possible to fold supporting rods wholly inside range of aluminum tubes, making it convenient to carry.

10 Claims, 5 Drawing Sheets

FOLDABLE FLOOR STAND FOR GUITAR

CROSS-REFERENCES TO RELATED APPLICATIONS

This application claims the priority of Chinese patent application no. 201520861154.X, filed on Nov. 2, 2015, the entire contents of all of which are incorporated herein by reference.

FIELD OF THE UTILITY MODEL

The present utility model relates to the field of stands and, more particularly, to a foldable floor stand for guitar.

BACKGROUND

Most of the current stands for guitar or some other musical instruments comprise two supporting rods and two leg tubes, while in most cases, the connections between the two leg tubes and the two supporting rods are fixed, without any abilities for adjustments. However, guitars are various in styles, especially for an electric guitar and an acoustic guitar, their placement spaces are different, since the distance between the supporting rods and the leg tubes is not adjustable freely, the stands in the prior art are very inconvenient to use. While the supporting face of the supporting rods cannot fully contact with the contact face of the guitar, the frictions between the guitar and the stand may decrease, which means placing a guitar onto such a stand lacks a high stability and a high security. Also, the function of folding a guitar stand for storage, in the prior art, needs to be improved.

Therefore, the prior art needs to be improved and developed.

BRIEF SUMMARY OF THE DISCLOSURE

The technical problem to be solved in the present utility model, aiming at the defects of the prior art, provides a foldable floor stand for guitar, which may increase frictions between the guitar stand and a guitar, in order to make the placement of any guitar more stable, more secure, and harder to slide and fall.

In order to achieve the above targets, the technical solution of the present utility model is as follows.

One aspect of the present disclosure provides a foldable floor stand for guitar, comprising a plurality of supporting rods, whose top ends are intermeshed together, and a plurality of aluminum tubes connecting with the bottom ends of the supporting rods, applied to support a guitar.

Two plastic engagers are set on top of the supporting rods, a rotatable pad apparatus contacting with the guitar surface is arranged on the side of the plastic engager supporting the guitar.

A foldable floor stand for guitar comprises a plurality of supporting rods, whose top ends are intermeshed together, and a plurality of aluminum tubes connecting with the bottom ends of the supporting rods, are applied to support a guitar.

The aluminum tube connects to the supporting rod through a plastic unit in a sliding way, and a buckle device is set on the plastic unit, applied to fix the plastic unit to the aluminum tube.

The pad apparatus and the plastic engager stand compose an activity space, applied to accommodate the protection soft pad rotation.

The pad apparatus comprises a moveable plastic front shell and a moveable plastic back shell, set on the front and back ends of the plastic engager respectively; and a plastic supporting panel, connecting with the plastic front shell flexibly, a soft silicon protective pad is set on the plastic supporting panel, and a plastic back cover is set on the plastic back shell.

A coupling projection is set on either side of the movable plastic supporting panel, the coupling projection rotationally couples with a coupling dent set on either side of the plastic front shell.

The movable plastic supporting panel rotationally connects with the plastic front shell through a connection axle.

A plurality of teeth is set in the engaging part of both plastic engagers correspondingly.

The buckle device comprises a rotatable rotation axle, whose both ends are fixed in the plastic unit, and a buckle adapting to the rotation axle;

The pad apparatus and the plastic engager are connected by screws.

A shutter is arranged on the aluminum tube, which connects to the aluminum tube in a sliding way, to adapt to different styles of guitars.

The foldable floor stand for guitar as provided in the present utility model, due to adopting a pad apparatus to make the plastic supporting panel and the back face of the guitar contact in surface, frictions are increased and the placements of a guitar or other music instruments onto the stand are more stable, more secure, harder to slide and fall. Connecting the supporting rods and the aluminum tubes moveably, makes it convenient to adjust the positions of the supporting rods, to adopt different styles of guitars; also, it is possible to fold the supporting rods inside the range of the aluminum tubes in a whole, making it convenient to carry.

DETAILED DESCRIPTION

The present utility model provides a foldable floor stand for guitar, in order to make the purpose, technical solution and the advantages of the present utility model clearer and more explicit, further detailed descriptions of the present utility model are stated here, referencing to the attached drawings and some embodiments of the present utility model. It should be understood that the detailed embodiments of the utility model described here are used to explain the present utility model only, instead of limiting the present utility model.

Figure 1:
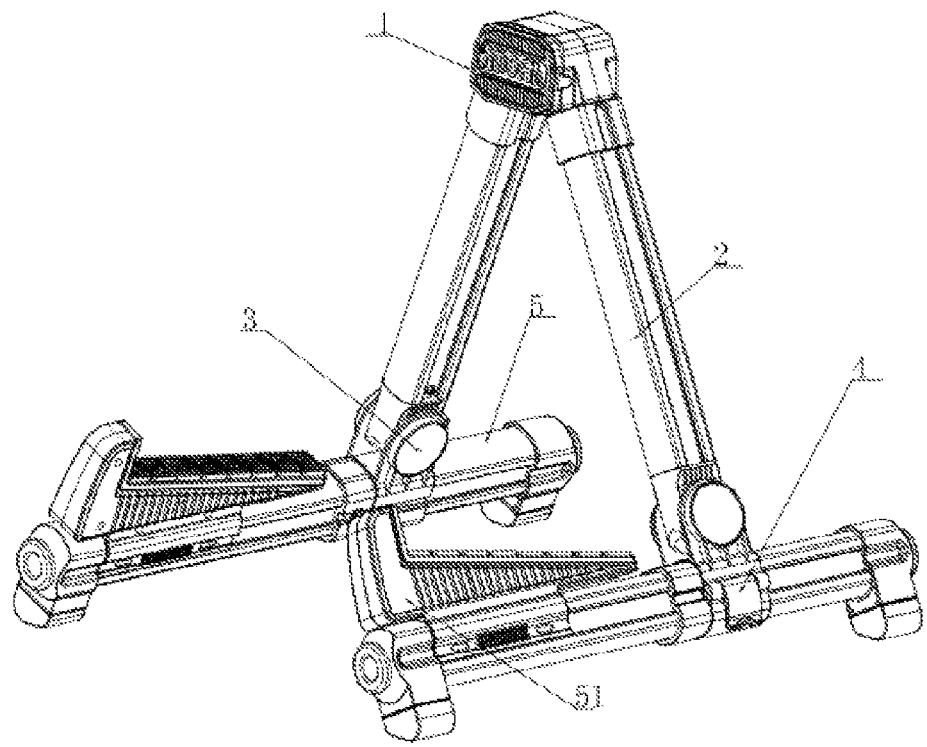
FIG. 1 illustrates a schematic diagram of an expanded foldable floor stand for guitar as provided in the present utility model.

Referencing to FIG. 1, the foldable floor stand for guitar as provided in the present utility model, includes a number of two supporting rods 2 and a number of two aluminum tubes 5, wherein, both top ends of the supporting rods 2 are intermeshing each other, and both aluminum tubes 5 connect to the bottom ends of the supporting rods 2, applied to support a guitar or other musical instruments. A number of two plastic engagers are set on top ends of both supporting rods 2, and through the two plastic engagers, the supporting rods 2 are intermeshing each other together. Turning the two supporting rods 2 to form a supporting angle, the aluminum tubes 5 and the supporting rods 2 compose a servo system to stand on the floor, a guitar may be placed on a pad on the aluminum tubes 5. In order to make a surface contact between the supporting panel of the stand and the back face of the guitar, on the side of the plastic engager supporting the guitar, there is a pad apparatus 1 contacting with the back face of the guitar set there.

Figure 2:
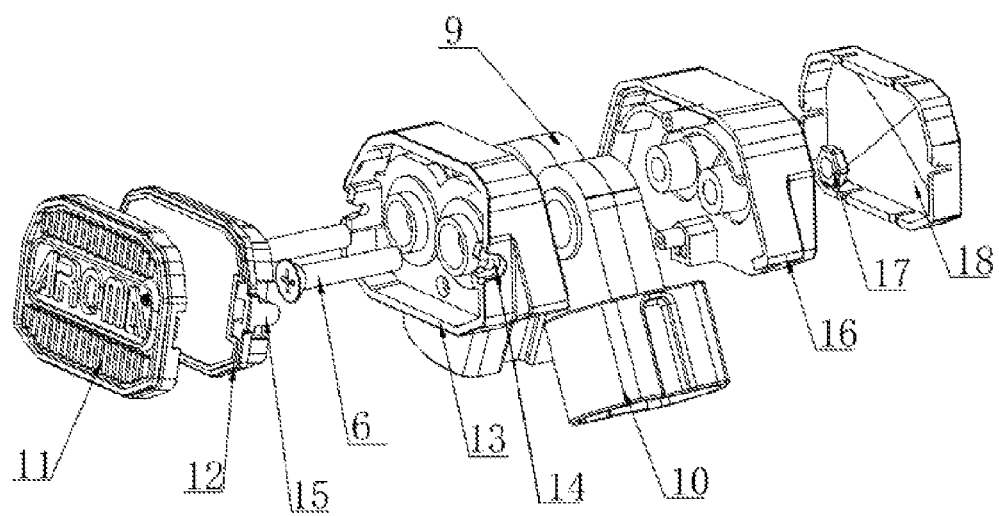
FIG. 2 illustrates an exploded diagram of a plastic engager and a pad apparatus in the foldable floor stand for guitar as provided in the present utility model.

Specifically, as shown in FIG. 2, the pad apparatus 1 comprises a plastic front shell 13, a plastic back shell 16, a plastic supporting panel 12, a soft silicon protective pad 11, and a plastic back cover 18. Wherein, the plastic front shell 13 and the plastic back shell 16 are set on the front and back ends of the plastic engager respectively. After intermeshing a left plastic engager 9 and a right plastic engager 10 together, the plastic front shell 13 is installed on front of the plastic engagers, and the plastic back shell 16 is installed on back of the plastic engagers, an accommodation space is composed between the plastic front shell 13 and the plastic back shell 16, which is applied to accommodate the two plastic engagers. The plastic back cover 18 is set on the plastic back shell 16, a screw 6 is adopted to connect the plastic front shell 13 and the plastic back shell 16 after they are intermeshed, and the screw 6 is fixed by a screw nut 17. The plastic back cover 18 is adopted to seal the plastic back shell 16 after connection.

The plastic supporting panel 12 flexibly connects with the plastic front shell 13, and a coupling projection 15 is set on either side of the movable plastic supporting panel 12, the coupling projection 15 rotationally couples with a coupling dent 14 set on either side of the plastic front shell 13. Specifically, as shown in FIG. 2, the coupling projection 15 is a projected half-length round object, and the coupling dent 14 is a concave part, applied to clip to the half-length round object, and after clipping, either the half-length round object or the concave part may rotate freely in a certain angle.

Figure 6:
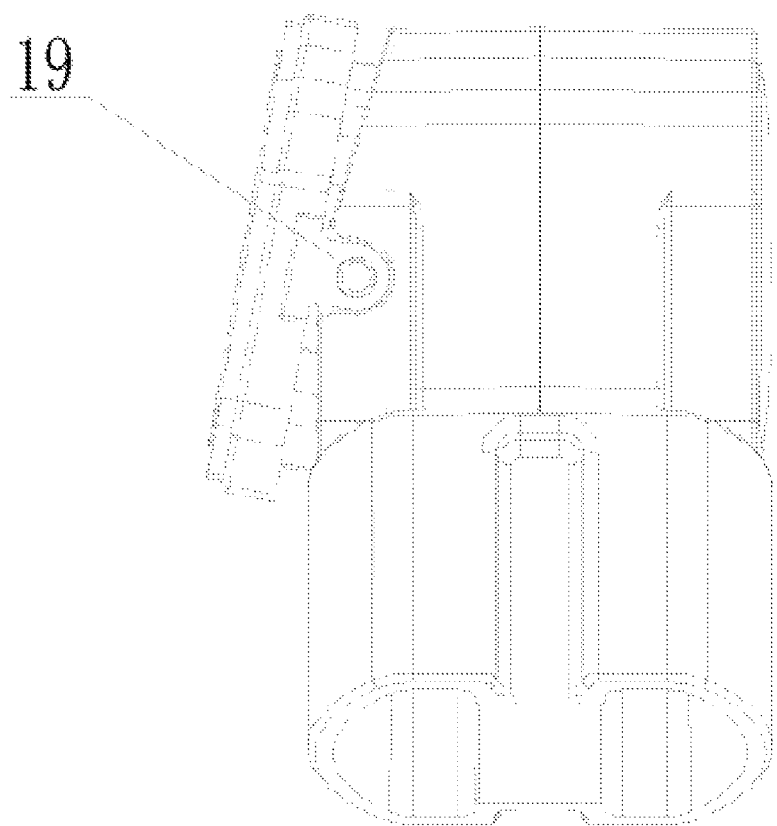
FIG. 6 illustrates a schematic diagram of another connection method between a pad apparatus and a supporting panel as provided in the present utility model.

As shown in FIG. 6, the pad apparatus 1 and the plastic engager stand are connected by a plurality of screws and composing an activity space, applied to accommodate the rotation of the soft silicon protective pad 11. When the back of the guitar is compressing the pad apparatus 1, a pad in the pad apparatus 1 contacting with the back of the guitar rotates in the activity space, before adapting to the compression force of the guitar, and making a surface contact between the pad and the back of the guitar, thus increasing the friction of the guitar when placing on the stand, making the placement of guitar more stable and more secure.

Another implement of the present utility model, as shown in FIG. 2 and FIG. 6 specifically, the movable plastic supporting panel 12 may also rotationally connect with the plastic front shell 13 through a connection axle 19, that is, a connection axle 19 is applied to connect the plastic supporting panel 12 to the plastic front shell 13, and making the plastic supporting panel 12 be able to rotate around the connection axle 19 on the plastic front shell 13, so when a guitar is placed on the stand, the plastic supporting panel 12 will surface contact with the back of the guitar, after adapting to the pressures from the stand.

Further, a soft silicone protective pad 11 is set on the plastic supporting panel 12, a texture being able to increase frictions, or, a plurality of texts or graphics may be set on the surface of the soft silicone protective pad 11, when the soft silicone protective pad 11 is in contact with the back of the guitar, it may make the guitar placement more stable and more secure, due to increasing the frictions. The soft silicone protective pad 11 may cover the plastic supporting panel 12.

Figure 3:
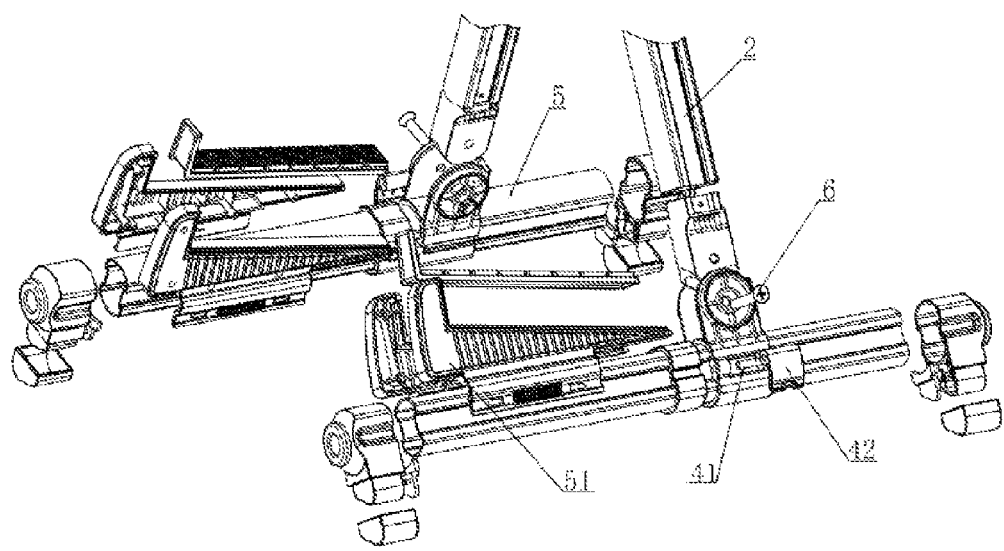
FIG. 3 illustrates an exploded diagram of an aluminum tube and a plastic unit in the foldable floor stand for guitar as provided in the present utility model.

The pad apparatus 1 in the foldable floor stand for guitar as provided in the present utility model, may be arranged separately in the guitar stand, may also be arranged together with a buckle device 4 provided in the present utility model, into the guitar stand. Of course, the buckle device 4 may also be set separately in the guitar stand. Specifically, as shown in FIG. 3, comparing to the above embodiment of the foldable floor stand for guitar provided in the present utility model, except for the supporting rods 2, whose ends are intermeshing together, and the aluminum tubes 5 connecting to the lower ends of the supporting rods, applied to support the guitar, are the same as those in the above embodiment, the differences of a new embodiment are: the aluminum tube 5 connects to the supporting rod 2 through a plastic unit 3 in a sliding way, while a buckle device 4 is set on the plastic unit 3, applied to fix the plastic unit 3 to the aluminum tube 5.

That is, when the buckle device 4 is open, the plastic unit 3 may slide back and forth, following the length direction of the aluminum tube 5, to change the positions of the supporting rod 2, thus different guitars with different thicknesses may be adapted. When it is needed to store the stand, open the buckle device 4 and slide the plastic unit 3 to the end of the plastic unit 3, that is, the right side of the aluminum tube 5 as shown in the FIG. 3. At this time, after folding, the top end of the supporting rod 2 falls onto the pad on the aluminum tube 5, which further protects the plastic supporting panel 12 in the stand, and prevents damages to the supporting panel.

Specifically, the buckle device 4 comprises a rotatable rotation axle 41, whose both ends are fixed in the plastic unit 3, and a buckle 42 adapting to the rotation axle 41. Installation holes to place the rotation axle 41 are arranged in the plastic unit 3. The rotation axle 41 may be usable after passing through the installation holes in the buckle 42 and being placed in the installation holes in the plastic unit 3. Pressing down the buckle 42 will lock the plastic unit 3 onto the aluminum tube 5. During using, it may adjust the positions of the plastic unit 3 on the aluminum tube 5 according to any real demands.

Figures 5A, 5B:
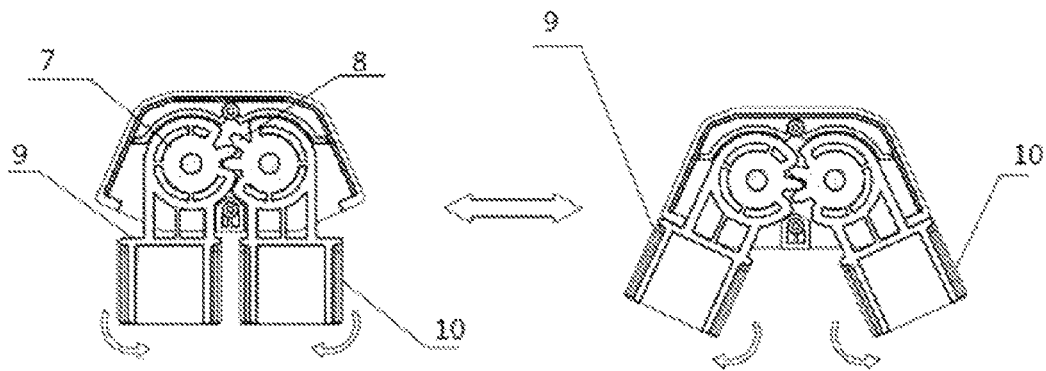
FIG. 5a illustrates a structural schematic diagram of a closed plastic engager as provided in the present utility model.
FIG. 5b illustrates a structural schematic diagram of an opened plastic engager as provided in the present utility model.

Further, as shown in FIG. 5, wherein, FIG. 5a illustrates a structural schematic diagram of a closed plastic engager as provided in the present utility model; FIG. 5b illustrates a structural schematic diagram of an opened plastic engager as provided in the present utility model. In the foldable floor stand for guitar, a plurality of teeth 8 is set in the engaging part 7 of both plastic engagers accordingly. Following the arrow direction and the anti-arrow direction as shown in the figure, the supporting rods 2 may be rotated, and teeth 8 in both plastic engagers may intermesh each other and rotate, which makes the stand for guitar open and close smoothly, and increases the good feeling. Both plastic engagers connect with the supporting rods 2 through screws.

Figure 4:
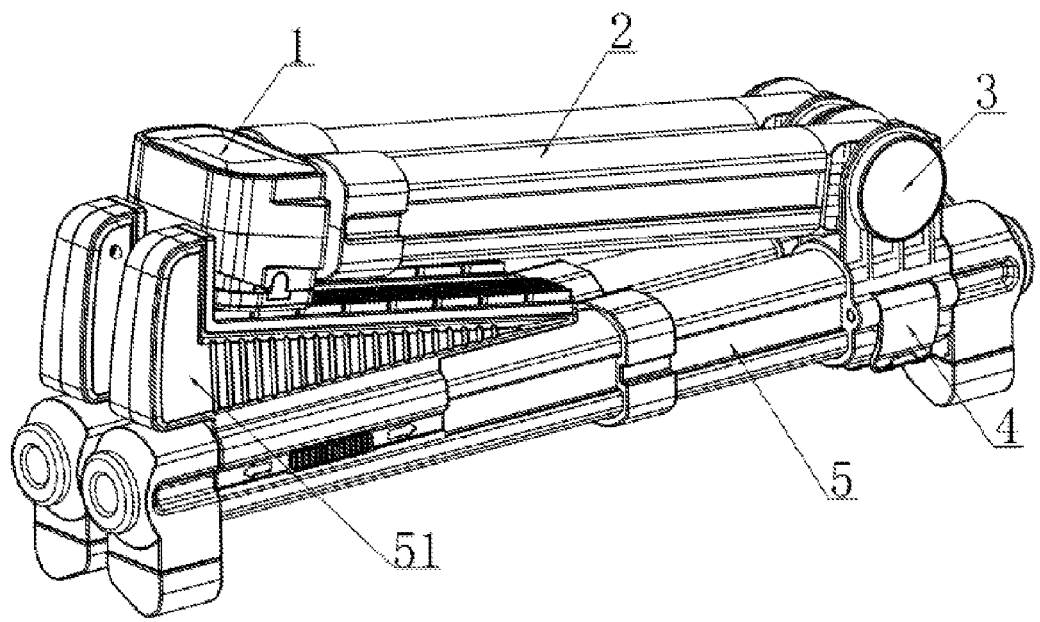
FIG. 4 illustrates a schematic diagram of a folded foldable floor stand for guitar as provided in the present utility model.
Figure 7:
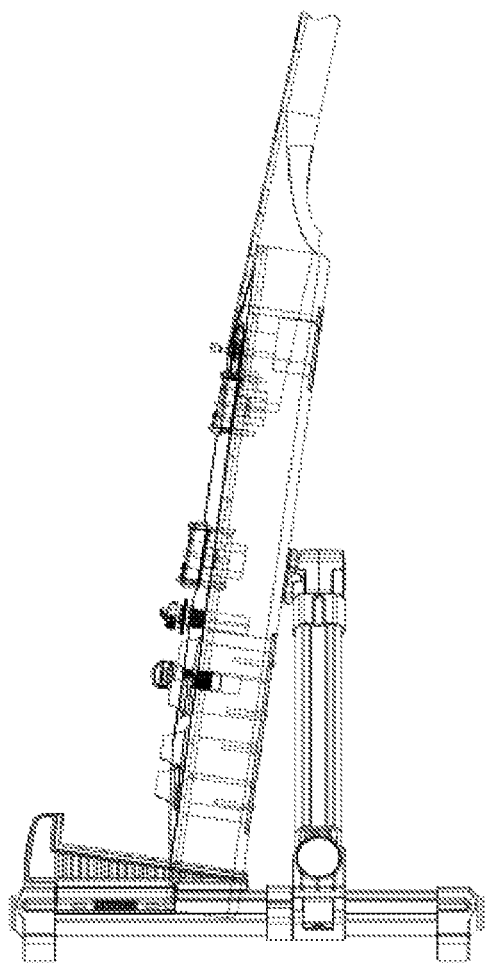
FIG. 7 illustrates a schematic diagram of placing an electric guitar on the foldable floor stand for guitar as provided in the present utility model.
Figure 8:
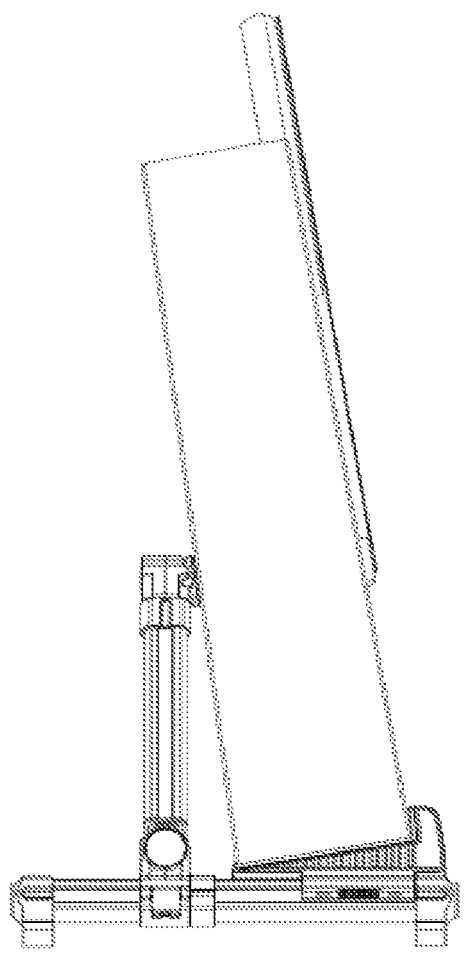
FIG. 8 illustrates a schematic diagram of placing an acoustic guitar on the foldable floor stand for guitar as provided in the present utility model.

As shown in FIG. 3 and FIG. 4, a shutter 51 is further arranged on the aluminum tube 5, and the shutter 51 connects with the aluminum tube 5 in a sliding way, to adapt to different styles of guitars. A toggle switch is set on the shutter 51, when pressing the toggle switch, the shutter 51 may be moved. As shown in FIG. 7 and FIG. 8, wherein, FIG. 7 illustrates a schematic diagram of placing an electric guitar on the foldable floor stand for guitar as provided in the present utility mode; FIG. 8 illustrates a schematic diagram of placing an acoustic guitar on the foldable floor stand for guitar as provided in the present utility model. When placing an electric guitar, the pad apparatus 1 will tilt a certain angle, to adapt to the pressure of the electric guitar, at this time, the pad apparatus 1 surface contacts with the electric guitar, and the movable shutter 51 slides on the aluminum tube 5 to fix the bottom of the electric guitar; when placing an acoustic guitar, the pad apparatus 1 will also tilt a certain angle, to adapt to the pressure of the acoustic guitar, now the movable shutter 51 fixes the bottom of the acoustic guitar, and the pad apparatus 1 surface contacts with the acoustic guitar.

In summary, the foldable floor stand for guitar as provided in the present utility mode, due to adopting a pad apparatus to make the plastic supporting panel and the back face of the guitar contact in surface, frictions are increased and the placements of a guitar or other music instruments onto the stand are more stable, more secure, hard to slide and fall. Connecting the supporting rods and the aluminum tubes moveably, makes it convenient to adjust the positions of the supporting rods, to adopt different styles of guitars; also, it is possible to fold the supporting rods inside the range of the aluminum tubes in a whole, making it convenient to carry.

It should be understood that, the application of the present utility model is not limited to the above examples listed. It will be possible for a person skilled in the art to make modification or replacements according to the above descriptions, which shall all fall within the scope of protection in the appended claims of the present application.

What is claimed is:

1. A foldable floor stand for a guitar, comprising:
   a plurality of supporting rods having top ends intermeshed together;
   a plurality of aluminum tubes connecting with bottom ends of the supporting rods for supporting the guitar;
   two plastic engagers set on top of the supporting rods; and
   a rotatable pad apparatus contacting with the guitar surface being arranged on the side of the plastic engagers for supporting the guitar.

2. The foldable floor stand for the guitar according to claim 1, wherein
   the aluminum tubes connect to the supporting rods through a plastic unit in a sliding way, and a buckle device is set on the plastic unit, applied to fix the plastic unit to the aluminum tubes.

3. The foldable floor stand for the guitar according to claim 2, wherein the buckle device comprises:
   a rotatable rotation axle having both ends fixed in the plastic unit; and
   a buckle adapting to the rotation axle.

4. The foldable floor stand for the guitar according to claim 1, wherein the pad apparatus and a plastic engager stand compose an activity space, applied to accommodate a protection soft pad rotation.

5. The foldable floor stand for the guitar according to claim 1, wherein the pad apparatus comprises:
   a moveable plastic front shell and a moveable plastic back shell, set on the front and back ends of the plastic engagers respectively; and
   a plastic supporting panel connecting with the plastic front shell flexibly, wherein a soft silicon protective pad is set on the plastic supporting panel, and a plastic back cover is set on the plastic back shell.

6. The foldable floor stand for the guitar according to claim 5, wherein a coupling projection is set on either side of the plastic supporting panel, the coupling projection rotationally couples with a coupling dent set on either side of the plastic front shell.

7. The foldable floor stand for the guitar according to claim 5, wherein the plastic supporting panel rotationally connects with the plastic front shell through a connection axle.

8. The foldable floor stand for the guitar according to claim 1, wherein a plurality of teeth is set in an engaging part of both plastic engagers correspondingly.

9. The foldable floor stand for the guitar according to claim 1, wherein the pad apparatus and the plastic engagers are connected by screws.

10. The foldable floor stand for the guitar according to claim 1, wherein a shutter is arranged on the aluminum tubes, and the shutter connects to the aluminum tubes in a sliding way for adapting to different styles of guitars.

* * * * *